United States Patent Office 2,810,697
Patented Oct. 22, 1957

2,810,697

RESINOUS PRODUCTS AND LUBRICANT COMPOSITIONS CONTAINING THEM

Troy L. Cantrell, Drexel Hill, Pa., John G. Peters, Audubon, N. J., and Herschel G. Smith, Wallingford, Pa., assignors to Gulf Oil Corporation, Pittsburgh, Pa., a corporation of Pennsylvania No Drawing. Application May 27, 1954,
Serial No. 432,916

14 Claims. (Cl. 252—42.7)

This invention relates to new resinous products and, more particularly, it is concerned with oil soluble resins which are advantageously used in various mineral oil lubricant compositions as inhibitors, detergents, etc.

It is an object of this invention to provide a new and useful class of mineral oil soluble, permanently thermoplastic, resinous reaction products. A further object of this invention is to provide products of the character described which are particularly suitable for the compounding of lubricating oils and other mineral oil lubricant compositions.

These and other objects are achieved by the present invention wherein mineral oil soluble, metal and sulfur containing, permanently thermoplastic, resinous materials are obtained by condensing in an aqueous medium, an alkylated monohydric phenol having at least one free reactive position in the nucleus, at least one alkyl group of such alkylated phenol containing at least 4 carbon atoms, formaldehyde, an alkaline earth metal hydroxide and ammonium sulfide $[(NH_4)_2S]$; at least one mol of formaldehyde being employed for every two mols of the phenol, the relative amounts of ammonium sulfide and alkaline earth metal hydroxide being such as to yield a resin containing at least about 0.5 percent by weight of sulfur, and at least one equivalent of the total of ammonium sulfide and alkaline earth metal hydroxide being employed for every two mols of the phenol.

The resinous products obtained in accordance with this invention are good additives for mineral oil lubricant compositions, and the invention also contemplates such compositions.

In preparing the metal and sulfur containing resins of our invention, it is necessary not to permit substantial reaction between the phenol and formaldehyde in the absence of the ammonium sulfide and the alkaline earth metal hydroxide. Accordingly, it is preferred to mix all of the reactants and react them simultaneously. However, the ammonium sulfide and alkaline earth metal hydroxide can first be mixed with the formaldehyde and partially reacted followed by further reaction with the phenol.

The condensation reaction of our invention takes place spontaneously at room temperatures, but it is preferred to employ moderately elevated temperatures in order to obtain reasonably rapid reaction rates. It is ordinarily desirable not to exceed reaction temperatures of about 200°–210° F., at least in the initial stages, in order to avoid loss of formaldehyde, although this loss can be reduced when employing higher temperatures by the use of closed reaction vessels.

Since the formaldehyde is most conveniently used in the form of commercial aqueous formalin containing 37 percent by weight of formaldehyde, sufficient water for the reaction is generally contained in the formalin solution. However, the ammonium sulfide and the alkaline earth metal hydroxide can conveniently be dispersed and/or dissolved in water to form an aqueous slurry or solution even when formalin is used.

In order to obtain the oil soluble metal and sulfur containing resins of our invention, at least one mol of formaldehyde must be used for every two mols of the phenol. Amounts of formaldehyde less than this tend to yield oil-insoluble resins. Amounts of formaldehyde in excess of the amounts stated can be employed, since any formaldehyde in excess of the amount reacted is either volatilized off in the reaction or in the subsequent dehydration of the resin.

In general, the relative amounts of ammonium sulfide and alkaline earth metal hydroxide are so chosen that the sulfur content of the resulting resin, which is derived of course from the ammonium sulfide, does not fall below about 0.5 percent by weight. This amount of sulfur in the product gives more effective bearing corrosion inhibiting properties to a mineral lubricating oil compounded with the product than can be obtained with smaller amounts of sulfur. At the same time, the use of an alkaline earth metal hydroxide along with the ammonium sulfide insures the obtaining of an additive which does not objectionably stain or blacken silver bearing metals when incorporated in a mineral lubricating oil. It should be understood that the total amount of ammonium sulfide and alkaline earth metal hydroxide employed is in the proportion of at least one equivalent of such total for every two mols of the phenol.

After the condensation reaction described is completed, the temperature is raised to distill off all water, both that formed in the condensation and added with the reactants, to dehydrate the product. This or any other dehydration step conventional in the formation of resinous phenol-formaldehyde condensation products can be employed. Although the condensation reaction can be carried out solely in an aqueous medium, when the resinous product is to be used as a mineral oil additive, it is advantageous to use in addition a light naphtha solvent or a mineral lubricating oil of the same general type as the oil to which the resin is to be added. There is then obtained, after dehydration, a concentrate of the resin in solution in the naphtha or mineral lubricating oil, as the case may be. These concentrates are conveniently employed for blending the resins with mineral oils.

The phenolic compounds employed in preparing our new resins are alkylated monohydric phenols having at least one alkyl group of at least 4 carbon atoms. As will be understood by those skilled in the art, such phenols must have at least one reactive position in the nucleus which is free of substituents. The presence of at least one alkyl group of at least 4 carbon atoms in the phenol insures oil solubility of the resinous condensation products prepared therefrom. Phenols not containing such group tend to be insoluble in mineral lubricating oils.

The alkylated phenols can readily be prepared by alkylating phenol or the simple monohydric homologues thereof, such as the naphthols, cresols, and ethyl and propyl phenols, with an alkyl halide or an alkanol in the presence of a Friedel-Crafts catalyst. Alternatively, alkylation can be performed with an olefin in the presence of concentrated sulfuric acid as a catalyst. The alkyl halides, alkanols and olefins employed in these alkylation reactions contain at least 4 carbon atoms and are selected to yield such alkyl radicals as butyl, amyl, heptyl, octyl, nonyl, decyl, stearyl and cetyl. The long chain groups derived from paraffin wax are also suitable; these yield the so-called "wax" phenols. Alkyl substituents containing from 4 to 12 carbon atoms form a preferred class. The alkylation reactions described are conventional and need not be further elaborated here.

Representative alkyl phenols of the class described include: n-butyl phenol; sec-butyl phenol; tert-butyl phenol; 2-tert-butyl, 4-methyl phenol; 2,4-di-tert-butyl phenol; 2,6-di-tert-butyl phenol; 2-tert-butyl, 4-ethyl phenol; n- amyl phenol, di-tert-amyl phenol; hexyl phenols; heptyl phenols, n-octyl phenol; iso-octyl phenol (alpha, alpha, gamma, gamma tetramethylbutyl phenol); nonyl phenol; decyl phenol; tri-isobutyl phenol; "wax" phenols, etc. Particularly good results have been obtained with tetramethylbutyl phenol.

The alkaline earth metal hydroxides contemplated by this invention include the hydroxides of calcium, barium, strontium and magnesium.

The following examples are illustrative of the preparation of our alkaline earth metal and sulfur containing resinous products. Unless otherwise stated all parts are by weight.

*Example I.*—Into a reaction vessel equipped with means for agitation and heating, there were charged 1,260 parts of tetramethylbutyl phenol, 1,400 parts of a light mineral oil having a viscosity at 100° F. of 72.4 S. U. S., 255 parts of a 20 percent aqueous solution of ammonium sulfide and 708 parts of barium hydroxide, $Ba(OH)_2 \cdot 8H_2O$. The mixture was heated sufficiently to melt the phenol and 520 parts of formalin were then slowly added while holding the temperature at 160° F. The temperature was then slowly raised to 210° F. and held there for one hour. The condensation product was then dehydrated by raising the temperature to 310° F. and applying a partial vacuum for 15 minutes. Eighteen hundred (1,800) parts of the same light mineral oil previously used were then added; the mixture was stirred and then filtered through diatomaceous earth. The concentrate of the resinous additive thus prepared had the following properties:

| | |
|---|---|
| Gravity, °API | 15.8 |
| Viscosity, SUS: | |
| 100° F. | 283 |
| 210° F. | 47.0 |
| Color, ASTM Union | 8.0 |
| Sulfur, B, percent | 0.59 |
| Ash as sulfate, percent | 9.87 |

*Example II.*—Into a reaction vessel, there were charged 2 mols of barium hydroxide octahydrate, 8 mols of formalin and 2 mols of a 20 percent aqueous solution of ammonium sulfide. These reactants were agitated at a maximum temperature of 160° F. for a period of 30 minutes. There were then added to the mixture 4 mols of tetramethylbutyl phenol and the temperature was increased to 180° F. and maintained there for one hour while the reaction mass was agitated. Thereafter, the temperature was slowly raised to 280° F. to distill off all water and dehydrate the product. The product was then filtered while molten and was then allowed to cool and solidify. There was obtained a dark amber resin having a specific gravity at 74° F./60° F. of 1.3122, a sulfur content of 3.26 percent by weight, a sulfate ash of 25.81 percent by weight and an indefinite melting point in the range 175°–195° F.

*Example III.*—There were charged to a reaction vessel 82 parts of tetramethylbutyl phenol and 200 parts of a light mineral lubricating oil having a viscosity at 100° F. of about 150 S. U. S. Into another reaction vessel, there were added 15 parts of calcium hydroxide, 20 parts of formalin and 20 parts of a 20 percent aqueous solution of ammonium sulfide, and the mixture was agitated for 30 minutes while maintaining the temperature below 160° F. The mixture was then added to the tetramethylbutyl phenol and mineral oil in the first reaction vessel. While agitating the whole, the temperature was maintained at about 180° F. for a period of one hour and then slowly raised to 280° F. in order to dehydrate the product. The concentrate of the resin thus prepared was then filtered and had the following properties:

| | |
|---|---|
| Gravity, °API | 18.8 |
| Viscosity, SUS: | |
| 100° F. | 3250 |
| 210° F. | 132.5 |
| Color, ASTM Union | 6.0 |
| Sulfur, B, percent | 1.51 |
| Ash as sulfate, percent | 5.12 |
| Neutralization No. | 0.31 alk. |

While the above examples have illustrated the use of tetramethylbutyl phenol, the preferred phenol, the other monohydric alkylated phenols disclosed herein can be used with good results.

The metal and sulfur containing resinous products of our invention are excellent addition agents for mineral oil lubricant compositions. They are readily soluble in all types of mineral lubricating oils, that is, paraffinic, naphthenic or mixed base oils, and can be blended with them in high proportions. This excellent solubility of our new products enables the preparation of concentrated solutions thereof, as shown in the examples, which may then be diluted with additional oil to the proportions desired in the final mineral oil composition. These new addition agents confer effective detergent and rust inhibiting properties on the mineral lubricating oils with which they are incorporated, and generally confer good bearing corrosion inhibiting properties on the oils containing them. For these purposes, our new addition agents are added to mineral lubricating oils in minor amounts, say from about 0.1 to about 25 percent by weight of the oil, sufficient to confer improved detergent properties on the oils in which they are incorporated. Generally, the addition of about 1 or 2 percent by weight of our new resins is sufficient to effect the desired improvement, but for heavy duty applications larger amounts are employed.

The following examples illustrate the use of our new resinous products to obtain improved mineral oil lubricant compositions.

*Example IV.*—An improved oil for the lubrication of diesel engines was prepared by treating a highly refined lubricating oil base with 9 percent by volume of the additive concentrate prepared according to Example I. The base oil and the treated oil had the properties shown below.

| | Base Oil | Treated Oil |
|---|---|---|
| Gravity, ° API | 23.7 | 23.1. |
| Viscosity, S. U. S.: | | |
| 100° F | 1,250 | 1,100. |
| 210° F | 84.2 | 79.5. |
| Color, ASTM Union | 3.25 | 5.5. |
| Ash as Sulfate, Percent | | 0.11. |
| Corrosion Test, EMD L. O. 201–47, Silver Plated Strip: | | |
| Wt. Change, Grams | | 0.0004. |
| Appearance | | light stain. |

*Example V.*—An improved motor lubricating oil was prepared by treating a motor lubricating oil base with 4 percent by volume of the additive concentrate prepared according to Example III. A comparison of the treated and untreated oils showed the following:

| | Base Oil | Treated Oil |
|---|---|---|
| Gravity, ° API | 28.2 | 27.8. |
| Viscosity, SUS: | | |
| 100° F | 556 | 575. |
| 210° F | 66.4 | 68.0. |
| Viscosity Index | 97 | 99. |
| Flash, OC, ° F | 480 | 475. |
| Fire, OC, ° F | 555 | 540. |
| Color, ASTM Union | 4.75 | 4.75. |
| Appearance | bright | bright. |
| Copper Strip Test, 212° F., 3 Hr | passes | passes. |
| Corrosion Test, ASTM D-665-46 T, Distilled Water: | | |
| Steel Rod, Appearance | rust | bright. |
| Area Rusted, Percent | 100 | 0. |
| Centrifuge Test, Separation, Percent, 1,500 R. P. M., Room Temp., 2 Hr. | nil | nil. |
| U.-V. Light Stability, Quartz Tube, 8 Hr.: Appearance. | bright | bright. |
| Engine Test, CRC L-4: | | |
| Engine Condition Rating | failed to complete. | 89. |
| Bearing Loss: Mg./Whole Bearing | | 22. |

As shown in the above examples our new addition agents confer effective detergent properties. Thus the engine condition rating shown under the CRC L–4 engine test indicates the freedom from engine deposits obtained. As shown by the data under bearing loss, which indicates the amount of bearing corrosion expressed in milligrams loss in weight of a standard bearing, the new resins tested confer excellent bearing corrosion inhibiting properties.

While we have shown in the examples lubricant compositions containing certain resins, our invention is not to be taken as limited to such resins, but comprises all of such materials within the purview of this disclosure. Furthermore, the invention is not limited to the use of our metal and sulfur containing resins in the preparation of compounded lubricating oils, but comprises all mineral oil lubricants containing our new agents, such as greases and the like. As is known in the lubricating art, other additives in addition to the resins of our invention can be employed. These are materials such as pour point depressants, viscosity index improvers, antifoam agents, antioxidants, coloring materials, thickeners and the like.

We claim:

1. The process of preparing an oil soluble, metal and sulfur containing, permanently thermoplastic, resinous condensation product which comprises condensing in an aqueous medium formaldehyde, ammonium sulfide, an alkaline earth metal hydroxide and an alkylated monohydric phenol having at least one free reactive position in the nucleus, at least one alkyl group of such alkylated phenol containing at least 4 carbon atoms; at least one mol of formaldehyde being employed for every two mols of the phenol, the relative amounts of ammonium sulfide and alkaline earth metal hydroxide being such as to yield a resin containing at least about 0.5 percent by weight of sulfur, and at least one equivalent of the total of ammonium sulfide and alkaline earth metal hydroxide being employed for every two mols of the phenol; the condensation being conducted to avoid substantial reaction between the phenol and formaldehyde in the absence of the ammonium sulfide and alkaline earth metal hydroxide.

2. The process of claim 1 wherein the condensation is carried out in a mineral oil, and there is recovered a solution of the metal and sulfur containing resinous reaction product in the mineral oil.

3. The process of claim 1 wherein the alkyl group of the alkylated monohydric phenol contains from 4 to 12 carbon atoms.

4. The process of claim 1 wherein the alkaline earth metal hydroxide is calcium hydroxide and the phenol is tetramethylbutyl phenol.

5. The process of claim 1 wherein the alkaline earth metal hydroxide is barium hydroxide and the phenol is tetramethylbutyl phenol.

6. An oil soluble, metal and sulfur containing, permanently thermoplastic, resinous condensation product obtained by the process of claim 1.

7. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 1.

8. A lubricant composition comprising a major amount of a mineral lubricating oil and from 0.1 to 25 percent by weight of an oil soluble, metal and sulfur containing, permanently thermoplastic, resinous condensation product obtained by the process of claim 1.

9. A mineral oil solution of an oil soluble, metal and sulfur containing, permanently thermoplastic, resinous condensation product obtained by the process of claim 2.

10. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 3.

11. An oil soluble, metal and sulfur containing, permanently thermoplastic, resinous condensation product obtained by the process of claim 4.

12. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 4.

13. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 5.

14. An oil soluble, metal and sulfur containing, permanently thermoplastic, resinous condensation product obtained by the process of claim 5.

References Cited in the file of this patent

UNITED STATES PATENTS 2,506,900     Smith et al.     May 9, 1950